United States Patent
Carroll et al.

(10) Patent No.: US 7,373,267 B2
(45) Date of Patent: May 13, 2008

(54) SYSTEM PERFORMANCE MONITORING SYSTEM

(75) Inventors: John R. Carroll, Lyndhurst, OH (US); Andre V. Augis, Windsor, OH (US); John Erinc, Mentor, OH (US); James J. Jacko, Broadview Heights, OH (US); Lisette E. Roy, Burton, OH (US); Thomas A. Schey, N. Royalton, OH (US); Lisa M. Thomas, Parma, OH (US); Wiley A. Wolfe, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/537,127

(22) Filed: Sep. 29, 2006

(65) Prior Publication Data

US 2008/0082284 A1    Apr. 3, 2008

(51) Int. Cl.
*A63F 9/00* (2006.01)
(52) U.S. Cl. .................................... 702/116
(58) Field of Classification Search ........... 702/112, 702/116
See application file for complete search history.

(56) References Cited

U.S. PATENT DOCUMENTS 3,718,813 A * 2/1973 Peatman .................. 702/110
5,401,025 A * 3/1995 Smith et al. ................ 463/5
2005/0128331 A1* 6/2005 Yoshida et al. ......... 348/333.01
2007/0016429 A1* 1/2007 Bournas et al. ............... 705/1
2007/0069850 A1* 3/2007 Anderson et al. .......... 340/3.51

OTHER PUBLICATIONS http://en.wikipedia.org/wiki/Sega_Mega_Drive, p. 1-14.*
Image feedback path tracking control using an uncalibrated CCD camera, Ku Chin Lin, Machine vision and application, 2000, p. 53-58.*

* cited by examiner

*Primary Examiner*—Tung S. Lau
(74) *Attorney, Agent, or Firm*—Boyle Fredrickson LLP; R. Scott Speroff

(57) ABSTRACT

An industrial controller performance monitoring system includes a detector connected to a controller. The detector is optically coupled to an output, such as a display, of equipment under test and the controller is configured to receive a signal from the equipment under test that is indicative of an instruction to generate the signal monitored by the detector. A comparison of the detection of the signal with the instruction to generate the signal provides an indication of operation of the equipment under test without interfering with operation of the equipment under test.

7 Claims, 5 Drawing Sheets

SYSTEM PERFORMANCE MONITORING SYSTEM

BACKGROUND OF THE INVENTION

The present invention is directed to a method and apparatus to monitor the performance of an industrial control system or the like and particularly to a performance monitoring system that does not interfere with the operation of the monitored system or system display and that provides an indication of real-time operation of the monitored system.

The industrial controller of the monitored system communicates control signals to the individual devices or equipment such as motors, fans, blowers, pumps, valves, relays, and switches to generate the desired procedure. Frequently, the industrial controller includes an operator interface, such as a personal computer having a display and user input such as a keyboard and/or mouse. The operator interface facilitates operator interaction and monitoring of the industrial controller and operation of the monitored system. The display of the operator interface is generally configured to generate a schematic representation of the equipment and/or process being operated by the industrial controller. Accurate and timely representation of the condition of the equipment on the operator is important to operator interaction with the industrial controller.

Commonly, confirmation of an operating condition of the controlled equipment is confirmed through external monitoring or analysis of the process signals generated by the industrial controller. Such monitoring is often performed by a service technician, or other skilled personnel, connecting to or modifying the control system to acquire and monitor the signals generated by the industrial controller and communicated to the process equipment. Due to the labor and expense associated with such performance monitoring procedures, such monitoring may occur when a process error has already occurred.

Such monitoring procedures may also affect the real-time operation of the industrial controller. That is, embedded instructions configured to generate the desired monitoring signals, consume system resources that could otherwise be utilized for operation of the process equipment. Such monitoring procedures may also change or interfere with the operation of the industrial controller as compared to operation of the industrial controller when no performance monitoring is being conducted. As such, such performance monitoring systems may not accurately reflect non-monitored system performance and may be incapable of accurately determining the operating efficiency of the industrial controller. Such industrial controller performance monitoring systems are also incapable of confirming actual communication of a process condition signal to an operator.

Where the process display depicts a schematic representation of the process equipment, even though an industrial controller signal reflects communication of a corresponding signal to the display, the generation of the industrial controller signal does not confirm that a corresponding operator instruction has actually been displayed. Industrial controller usage as well as display update times each affect the time between the industrial controller generating the required operator instruction signal and the display of the signal associated with a given instruction of the industrial controller. As such, although the industrial controller has instructed that a signal be displayed to an operator, there may actually be a delay or lag between the industrial controller generating the instruction and the display communicating the instruction to an operator. Such lag results in inefficient operator interaction with the process controlled by the industrial controller and is not accounted for by performance monitoring systems.

Another consideration of controller performance monitoring is the comparison of process performance when different industrial controllers are utilized. That is, where it is desired to determine the operating efficiency of an industrial process when the process is operated with different control programs, it is often required to configure the industrial controller to operate with one control program and then reconfigure the industrial controller to operate with another control program. Comparing the performance of the industrial controller requires independently monitoring each industrial controller and inserting the performance monitoring programs into each of the respective control programs. Such performance monitoring is difficult to implement and suffers from the same inaccuracies addressed above with respect to the interference of the process system control by the monitoring system and non-confirmation of the display of the operator instructions.

Where one industrial controller program may provide a display instruction before another industrial controller program, the actual display of a signal associated with a given display instruction is not confirmed by the internal monitoring of the industrial controller program performance. The actual display of an operator instruction associated with a signal generated by the industrial controller may take place later under one controller program even though the signal associated with generation of the operator instruction is provided sooner as compared to another industrial controller program. As such, such monitoring systems have a tendency to provide information that is misrepresentative of the actual display of operator instructions. Accordingly, it is desired to provide an industrial controller performance monitoring system that confirms communication of a process signal to an operator. It is also desired to provide an industrial controller monitoring system that does not interfere with operation of the industrial controller being monitored to provide an accurate representation of non-monitored performance of the industrial controller.

SUMMARY OF THE INVENTION

The present invention provides a performance monitoring system that monitors the performance of an industrial controller without interfering with operation of the system being monitored. Specifically then, the present invention provides a monitoring system having a detector that is optically coupled to an output of a display of a system under test. The controller is configured to receive a signal from the system under test that is indicates execution of an instruction to generate the signal on the display. A comparison of the detection of the signal with the signal generated by the instruction provides an indication of the response time.

Therefore, in accordance with one aspect of the present invention, a system for determining display responsiveness is disclosed. The system includes a photo-sensor and a test managing system. The photo-sensor is operatively positioned relative to a display connected to an operating system. The display is configured to generate an output in response to instructions from the operating system. The test managing system is configured to receive the output from the photo-sensor and a signal from the operating system. The test managing system determines a display response time from the output and the signal.

In accordance with another aspect of the present invention, a performance monitoring system is disclosed that has a plurality of detectors operatively associated with a plurality of optical outputs on a display of a system being monitored. A controller is configured to receive a first input and a second input. The first input is communicated to the controller from at least one of the plurality of detectors and is indicative of an event at the optical output associated with the at least one detector. The second input is indicative of an instruction from the system being monitored to generate the event at the optical output. The controller and the detector operate non-interferingly with the system being monitored.

According to a further aspect of the present invention, a method of determining performance of a system is disclosed. The method includes the steps of operating a system under test that is configured to monitor a device and provide an output signal indicative of a condition of the device. The method displays the output signal and includes connecting a test management system to the system under test to monitor operation of the system under test without interfering with operation of the system under test. The method confirms the display of the output signal and compares the confirmation of the display of the output signal and an instruction to generate the display of the output signal.

These and various other features, aspects, and advantages of the present invention will be made apparent from the following description of the drawings.

BRIEF DESCRIPTION OF THE DRAWINGS

The drawings illustrate one preferred embodiment presently contemplated for carrying out the invention. In the drawings.

DETAILED DESCRIPTION OF THE PREFERRED EMBODIMENT

Figure 1:
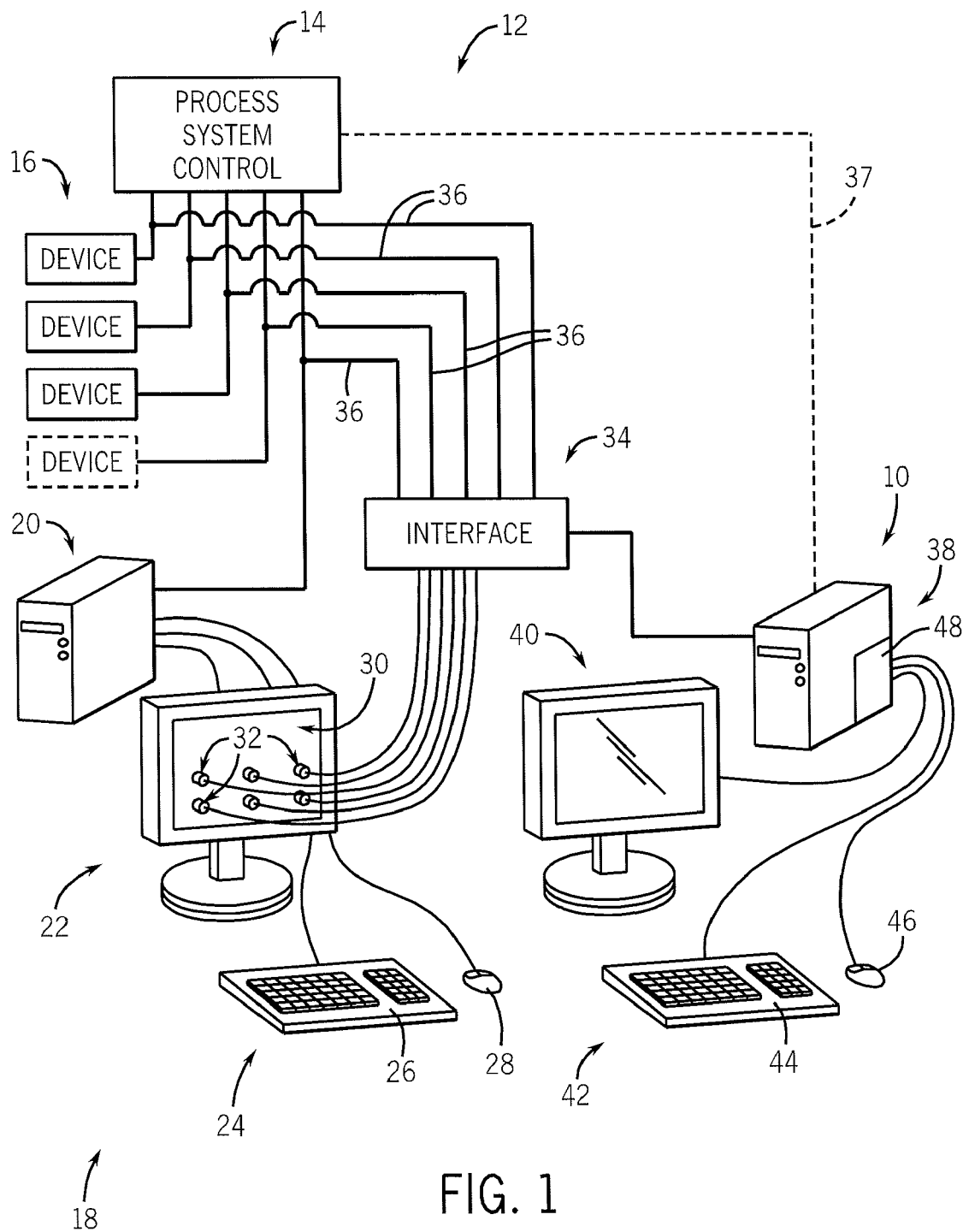
FIG. 1 is a perspective view of a schematic representation of a system performance monitoring system according to the present invention interconnected to a system being monitored.

Referring to FIG. 1, a system for determining display responsiveness, a performance monitoring system, or monitoring system 10 is connected to equipment under test 12. Equipment under test 12 includes a process system controller or industrial controller 14 that is connected to any number of control devices 16. Understandably, devices 16 could be any of motors, fans, pumps, valves, relays, solenoids, or any other process system device where the status of their performance is to be monitored.

An operator interface 18 is connected to industrial controller 14 and configured to allow operator interaction and operation of devices 16. An optional personal computer or other process system CPU 20 is connected to industrial controller 14 and supports an operator output or display 22 and an operator input 24 such as a keyboard 26 or a mouse 28. Such a configuration allows an operator to interface, monitor, and control operation of devices 16 via industrial controller 14 from a location remote from the location of the process system or system devices. Furthermore, such a configuration allows an operator to monitor and control operation of a plurality of devices 16 from a single convenient location. Understandably, the operation and device connectivity of CPU 20 can be integral with process system control 12.

Display 22 includes a screen 30 that optically communicates to an operator the condition or status of devices 16. Monitoring system 10 includes a plurality of detectors 32 that are oriented relative to screen 30 to confirm the output of a signal associated with operation of the process. Detectors 32 are generally defined as optical detectors and include photo-sensors, photodiodes, or like type devices. Preferably, detectors 32 are photodiodes and are oriented to be responsive to the illumination or other display signals or operator instructions or outputs generated at screen 30.

Detectors 32 are connected to an interface 34 and communicate confirmation of the operator output of equipment under test 12. Preferably, interface 34 transforms the signal communicated from detectors 32 for the monitoring system 10. In a test condition, the monitoring system can be configured to output a signal 37 into the system under test 12 and monitors a detector input associated with the graphic status of the operator output. A plurality of connectors 36 are connected to equipment under test 12 and communicate a signal associated with the device instruction signal and the instruction to display the instruction to interface 34. A monitoring system control 38 is connected to interface 34 and is configured to receive the signals communicated from detectors 32 and connectors 36. Understandably, although interface 34 is shown as separate from monitoring system control 38, interface 34 could be formed integrally with the monitoring system control. Performance monitoring system 10 includes an output, preferably a display 40 and an input 42, preferably a keyboard 44 and a mouse 46. Display 40 and inputs 42 allow monitoring system operators to view the variable information acquired by monitoring system 10. Monitoring system control 38 includes a data log or database 48 configured to store the information communicated to interface 34 of performance monitoring system 10 to allow later review and/or comparison of the performance of equipment under test 12.

Figure 2:
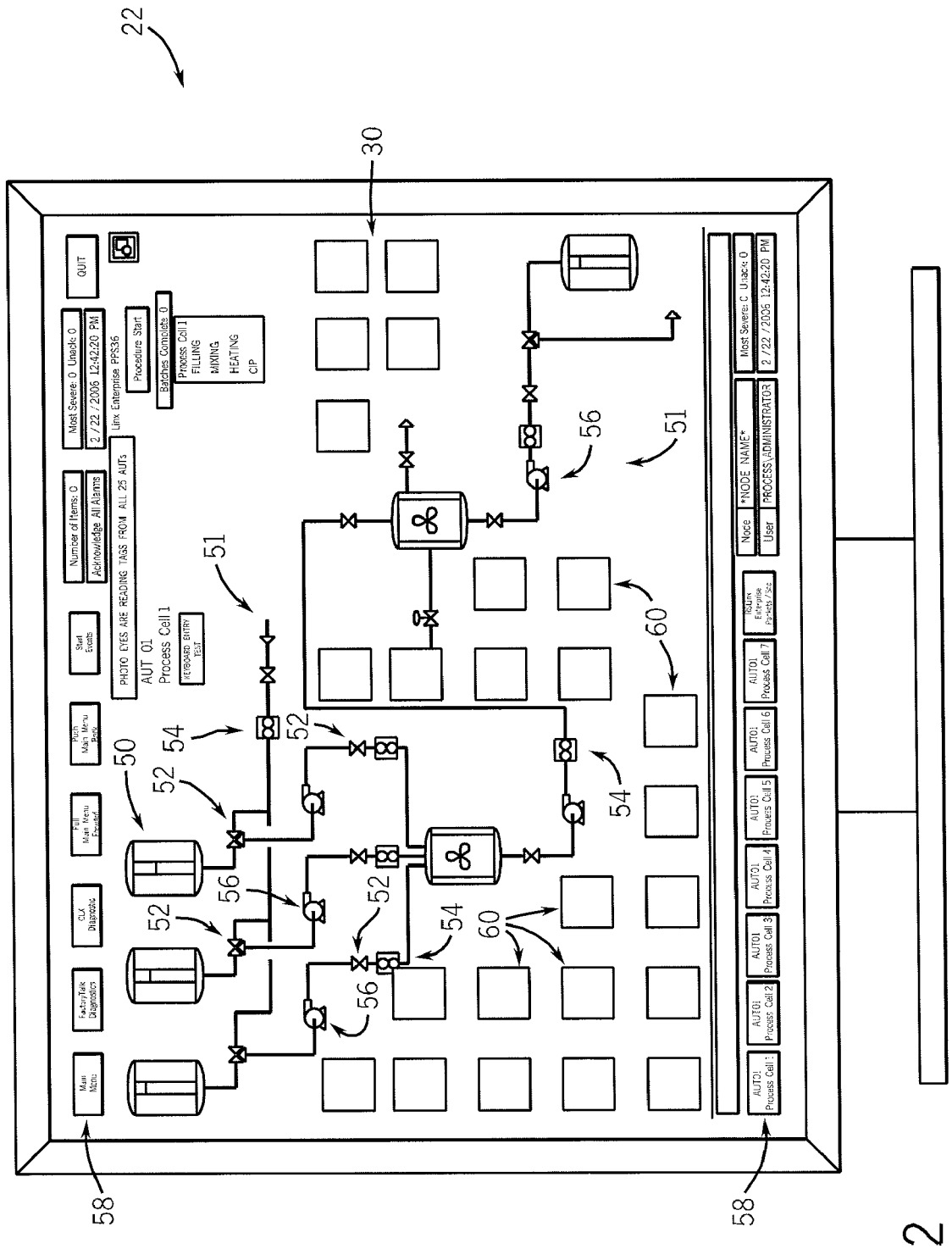
FIG. 2 is a schematic representation of an operator output of the system under test shown in FIG. 1.

FIG. 2 is an exemplary representation of an output of screen 30 of equipment under test 12. Screen 30 displays several icons 51 associated with the devices of the process system. As represented by icons 51 in the output of screen 30, devices 16 of equipment under test 12 include a number of tanks 50, valves 52, flow meters 54, and pumps 56, to name but a few. Understandably, these devices are only representative of some of the process system devices that can be controlled by industrial controller 14 and monitored by performance monitoring system 10. Screen 30 also displays a plurality of buttons 58 configured to allow operator interaction with industrial controller 14 and the devices controlled by the process system control. Understandably, the orientation of icons 51 and buttons 58 are configured and oriented to allow an operator to quickly visual inspect and ascertain the condition of the process system. It is further understood that the output displayed on screen 30 can be configured for a number of screens associated with a number of process systems.

Screen 30 also includes a number of detector areas 60 oriented to optically engage a number of detectors configured to optically engage display 22. Detector areas 60 are configured to change color in response to a change in condition of an associated device of equipment under test 12. Alternatively, detector area 60 could be configured to be operatively associated with any one of icons 51 of display 22. In such a configuration, the change in display of the icon is perceivable by the detector associated with the respective icon. It is further appreciated that any one of detector areas 60 be associated with one or more of icons 51. Such a configuration reduces the total number of detectors required to monitor a selected number of devices represented in the operation of display 22.

Figure 3:
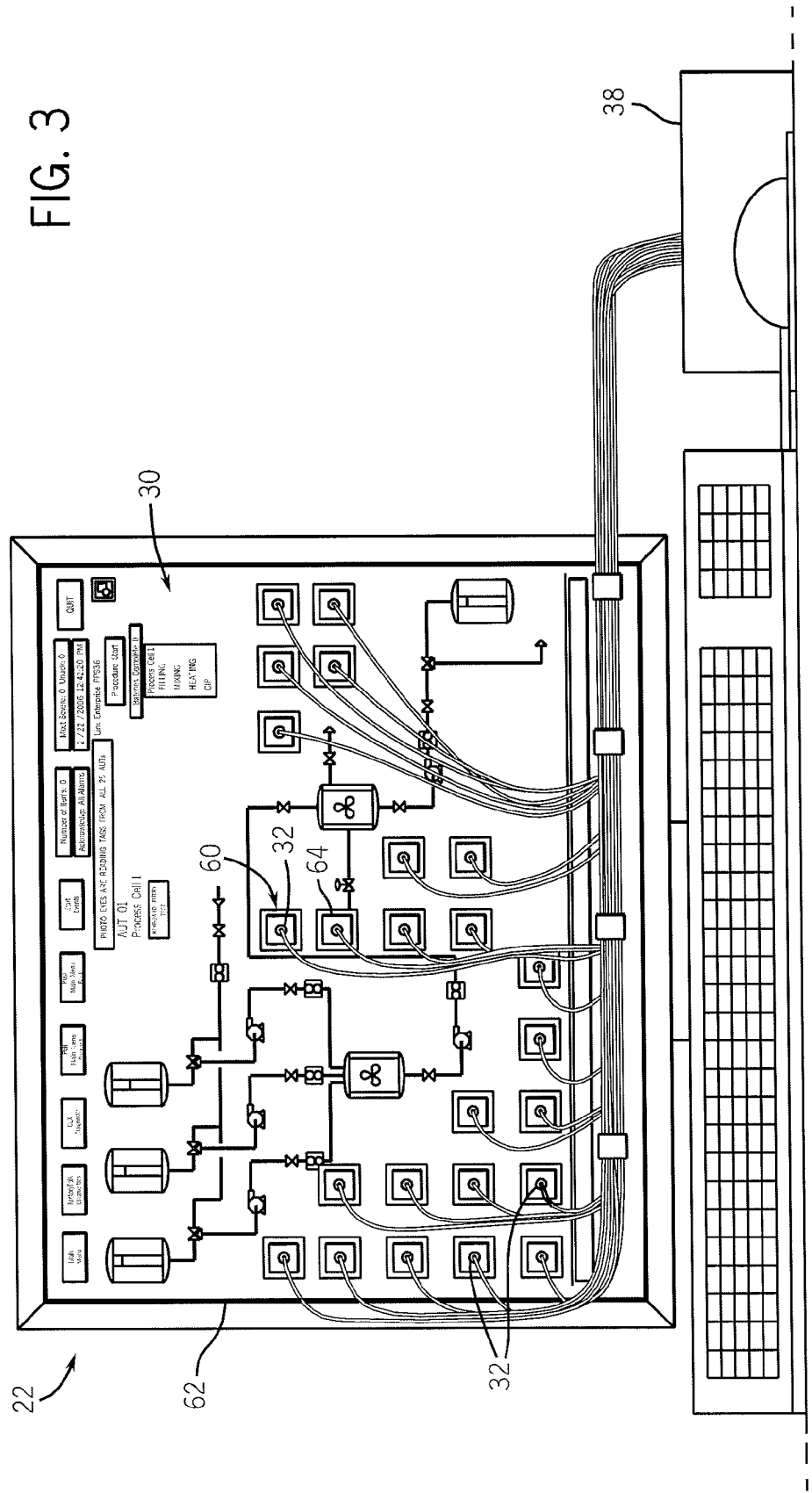
FIG. 3 is a perspective view of the system output detectors of the system performance monitoring system as shown in FIG. 1 engaged with the operator output shown in FIG. 2.

As shown in FIG. 3, each of detectors 32 is attached to a support 62 that is removably connected to display 22. Each detector 32 is attached to support 62 such that the detectors are generally aligned with detector areas 62 of screen 30 when the support is attached to display 22. Preferably, support 62 is transparent and does not interfere with the optical coupling of detectors 32 and the associated detector area 60. Each detector 32 engages a mount 64 attached to support 62. Preferably, mounts 64 are opaque and reduce the interference of background illumination with the optical coupling of detector 32 with detector area 60 of screen 30.

Detectors 32 are connected to interface 34 that send a signal to the monitoring system control 38 to determine the actual display performance of a process system control signal to the monitoring system control without interfering with the operation of the process system display or operation of the process system control. Although a plurality of detectors are shown, understandably one detector and detector area 60 could be configured to monitor a plurality of process system events. Furthermore, the noninterferring engagement of detectors 32 with equipment under test 12 allows for the extended and uninterrupted integration of the performance monitoring system with the process system during real time operating conditions of the process system. Such a configuration allows real time extended monitoring of the operation of the process system.

Figure 4:
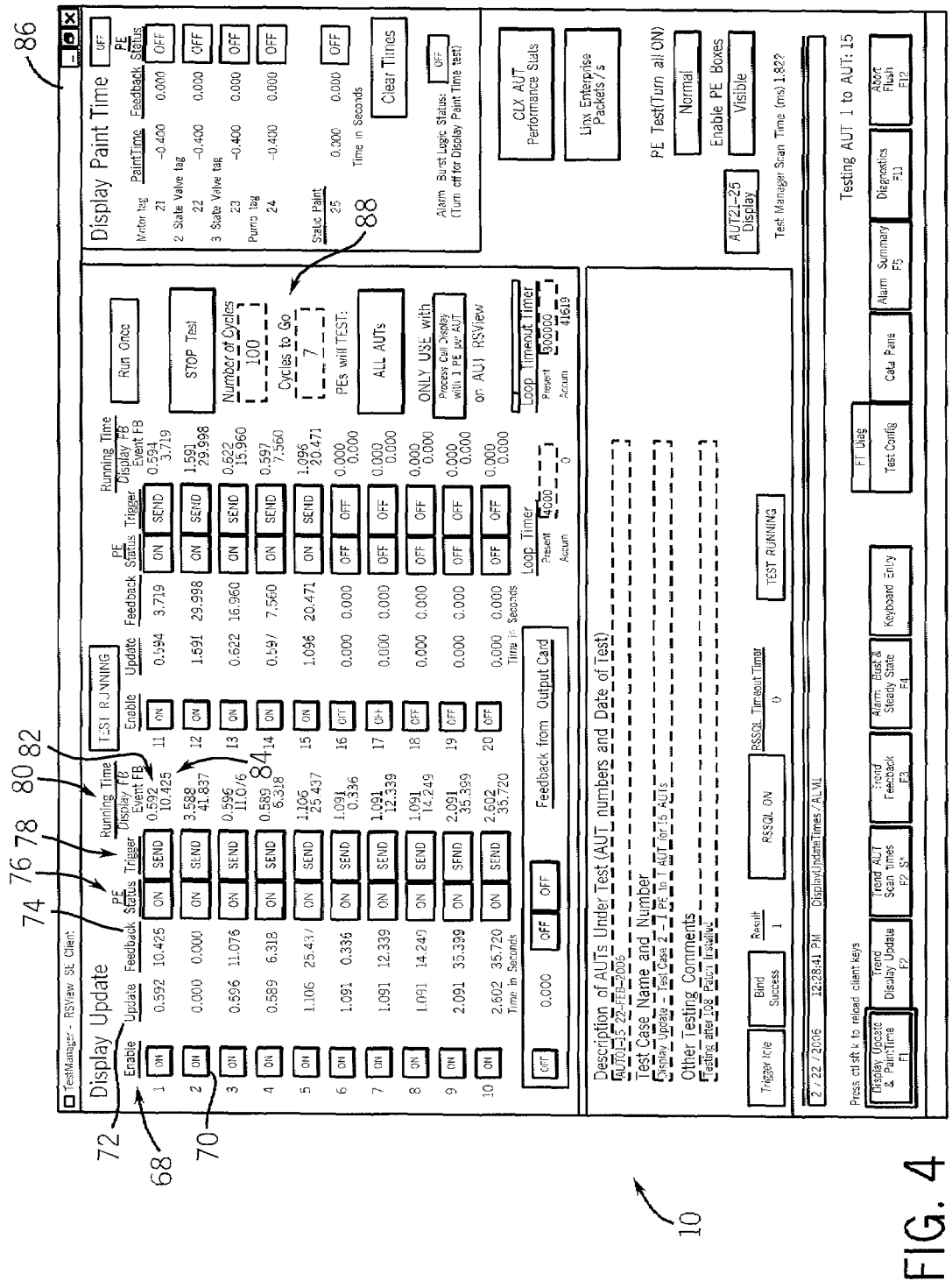
FIG. 4 is graphical representation of a display of the system performance monitoring system output.

FIG. 4 shows an exemplary display output of performance monitoring system 10. Understandably, the output of performance monitoring system 10 could be provided in a number of the formats and with a number of orientations and appearances. The test manager display 66 includes a first column 68 that includes a plurality of toggles 70 configured to indicate whether a circuit associated with a respective detector is enabled or disabled. An update column 72 indicates a sequential time a reverse video signal was delivered to screen 30 of display 22 of equipment under test 12. A feedback column 74 indicates the communication of a signal from performance monitoring system 10 to the respective detector and another signal to the process system associated with the respective detector. A detector status column 76 indicates the status of a respective detector as being "ON" or "OFF" and a trigger column 78 indicates that an event trigger has been communicated to the equipment under test 12. Performance monitoring system 10 includes a run time output 80 that displays both a displayed feedback interval 82 and an event feedback interval 84.

Display feedback interval 82 indicates the duration between a signal being communicated to the display of equipment under test 12 and generation of the output associated with the instruction. Event feedback interval 84 indicates the duration between an event trigger instruction communicated to equipment under test 12 and generation of the instruction from the process system to output the associated display. Performance monitoring system 10 monitors the responsiveness of display 22 of equipment under test 12 as well as the performance of equipment under test 12. Specifically, performance monitoring system 10 provides a duration indication between the generation of activity event signals and the actual display of the activity event signal on the screen associated with the equipment under test 12.

Performance monitoring system 10 includes a display paint time output 86 that provides an indication of the duration required to change a screen indication with respect to operation of the equipment under test 12. That is, at any given interval, depending on the demands of the process system, performance monitoring system 10 determines the responsiveness of the display 22 of equipment under test 12 as a function of the instructions being processed by the process system. Accordingly, display paint time output 86 provides an indication of the communicative connectivity of industrial controller 14 and display 22 of equipment under test 12 with the performance instructions or demands being performed by the equipment under test 12. Such an indication allows custom tailoring of the operation of industrial controller 14 to increase the responsiveness of the output of display signals to the display 22 of equipment under test 12. Particularly, during periods of heavy process system control load, display paint time output 86 provides an indication for improved configuration of industrial controller 14, operator interface 18, CPU 20, and display 22.

Performance monitoring system 10 further includes a monitoring cycle definition input 88 configured to allow a monitoring operator to configure the operation of process monitoring system 10 to provide a desired number of test cycles. The noninvasive integration of performance monitoring system 10 with equipment under test 12 and process display 22 allows nonintrusive testing of the performance of equipment under test 12 and display 22. Furthermore, the relatively simple connection of the performance monitoring system with the process system being tested reduces the skill required to test the performance of equipment under test 12 and display 22 as compared to known methods of testing the operation of a process system.

Figure 5:
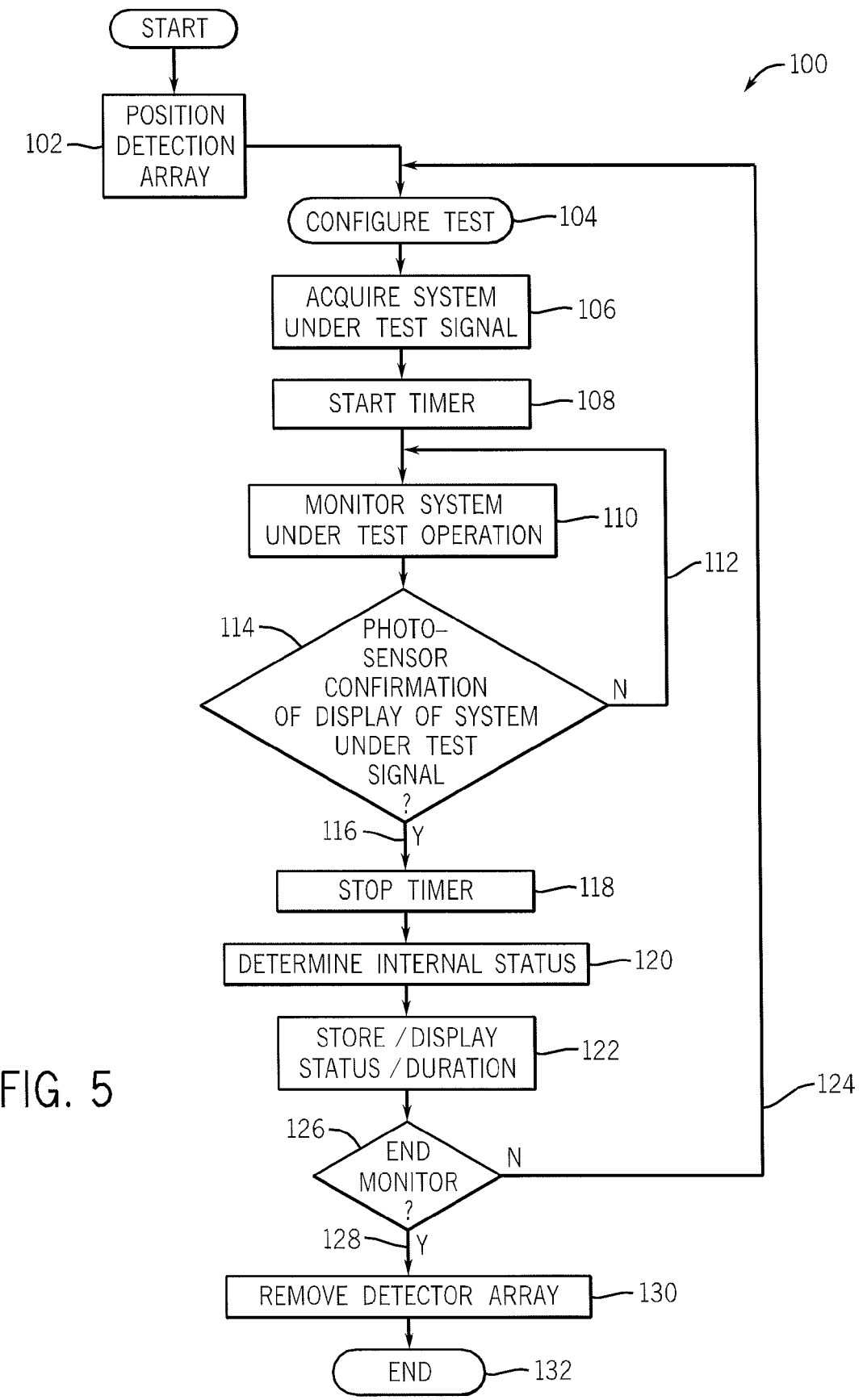
FIG. 5 is a schematic representation of one example of a process of operating the system performance monitoring system shown in FIG. 1.

FIG. 5 is a schematic representation of an exemplary operation process 100 of performance monitoring system 10. Process 100 begins with a setup by the positioning 102 of the detector array with respect to the display of the process system. An operator next configures test 104 for a desired test cycle associated with the respective process system. After the test has been configured, monitoring operation of process 100 starts by acquiring signals from the system under test 106 associated with signals associated with instructions for the display of the process system to output a given signal. Once the test signal has been acquired, process 100 starts a timer configured monitor the duration between initiation of the output signal and actual display of the signal associated with the output. Process 100 monitors or times the system under test 110 and the detectors associated therewith and continues to monitor the system under test 112 until confirmation from the detector of the display of the system under test signal 114, 116.

Having acquired confirmation of the display of the test signal, process 100 stops timer 118 and determines the interval and/or status 120 of equipment under test 12 and the respective detector. Alternatively, process 100 is configured to send a signal to the system under test and then waits for a graphic response on the operator interface. The wait time provides an indication of the response time of the system under test. Process 100 provides trend tracking or extended process system operation recordation through the storing and/or displaying of the status and/or duration associated with the generation of the output signal by equipment under test 12 and the actual display of the associated signal. If continued monitoring of the process system is desired 124, process 100 provides for the configuration of a subsequent test sequence. Alternatively 128, if termination of the performance monitoring is desired, 126, 128, the detector array is simply removed from the display of equipment under test 12 130 and the process 100 is terminated 132. Accordingly, process 100 provides a method of monitoring the performance of a process system and process system display that does not interfere or interrupt operation of the process system being monitored.

Therefore, a monitoring system according to the present includes a detector connected to a controller. The detector is optically coupled to an output, such as a display, of a system under test and the controller is configured to receive a signal from the system under test that is indicative of the instruction to generate the signal monitored by the detector. A comparison of the detection of the signal with the instruction to generate the signal provides an indication of operation of the system under test without interfering with operation of the system under test.

One embodiment of the invention is a system for determining display responsiveness that includes a photo-sensor and a test managing system. The photo-sensor is operatively positioned relative to a display connected to an operating system. The display is configured to generate an output in response to instructions from the operating system. The test managing system is configured to receive the output from the photo-sensor and a signal from the operating system. The test managing system determines a display response time from the output and the signal.

Another embodiment of the invention is a performance monitoring system that includes a plurality of detectors operatively associated with a plurality of optical outputs on a display of a system being monitored. A controller is configured to receive a first input and a second input. The first input is communicated to the controller from at least one of the plurality of detectors and is indicative of an event at the optical output associated with the at least one detector. The second input is indicative of an instruction from the system being monitored to generate the event at the optical output. The controller and the detector operate non-interferingly with the system being monitored.

A further embodiment of the invention is a method of determining performance of a system that includes the steps of operating a system under test that is configured to monitor a device and provide an output signal indicative of a condition of the device. The method displays the output signal and includes connecting a test management system to the system under test to monitor operation of the system under test without interfering with operation of the system under test. The method confirms the display of the output signal and compares the confirmation of the display of the output signal and an instruction to generate the display of the output signal.

Understandably, the present invention has been described above in terms of the preferred embodiment. It is recognized that various alternatives and modifications may be made to these embodiments which are within the scope of the appending claims.

What is claimed is:

1. An apparatus for determining the responsiveness of a control system comprising:
   a photo-sensor operatively positioned relative to a display connected to the control system, the display configured to generate an output in response to instructions from the control system indicative of a change in status of an industrial device whose operation is controlled by the control system; and
   a test managing system configured to receive the output from the photo-sensor and a signal from the control system associated with an instruction related to the change in status of the industrial device, the test managing system configured to determine a display response time for the output of the display and display the results of the determination with respect to the signal from the control system associated with the instruction without completely interfering with operation of the control system.

2. The apparatus of claim 1 further comprising a mount constructed to support a plurality of photo-sensors and constructed to be positioned relative to the display such that each of the photo-sensors is associated with a respective output.

3. The apparatus of claim 1 further comprising a support configured to support the photo-sensor and secure a position of the photo-sensor relative to the output.

4. The apparatus of claim 1 wherein the test managing system is configured to monitor operation of the operating system and determine a performance of the control by a comparison of a signal of the control system and the output of the display.

5. The apparatus of claim 1 wherein operation of the control system is unaltered by the test managing system.

6. The apparatus of claim 1 wherein the test managing system further comprises a data log constructed to maintain a history of operation of the operating system, the test managing system configured to determine a condition of the operating system over time.

7. The apparatus of claim 2 wherein the photo-sensor is a photodiode and the mount is light conducting.

* * * * *